United States Patent
Pickett et al.

Patent Number: 5,234,031
Date of Patent: Aug. 10, 1993

[54] COMBINATION SOLENOID VALVE AND SHUTTLE VALVE WITH SELF-CLEANING ORIFICE

[75] Inventors: Michael G. Pickett, South Bend; Thanh Ho, Mishawaka; Richard T. Hendrickson, South Bend, all of Ind.

[73] Assignee: Allied-Signal Inc., Morristown, N.J.

[21] Appl. No.: 938,790

[22] Filed: Sep. 1, 1992

[51] Int. Cl.⁵ .......................... F15B 13/044
[52] U.S. Cl. .................. 137/596.17; 137/112; 303/119.2
[58] Field of Search ............ 137/112, 596.17; 303/119 SV

[56] References Cited

U.S. PATENT DOCUMENTS

| | | | |
|---|---|---|---|
| 4,620,565 | 11/1986 | Brown | 137/625.65 X |
| 4,844,119 | 7/1989 | Martinic | 137/596.17 |
| 4,936,344 | 6/1990 | Gilbert et al. | 137/596.17 |
| 4,938,545 | 7/1990 | Shuey et al. | 303/119 SV |
| 5,005,919 | 4/1991 | Shuey et al. | 303/119 SV |
| 5,163,474 | 11/1992 | Rizk | 137/596.17 |

Primary Examiner—Gerald A. Michalsky
Attorney, Agent, or Firm—Larry J. Palguta; Ken C. Decker

[57] ABSTRACT

The combination solenoid valve and shuttle valve (60) with self-cleaning orifice (92) comprises a shuttle valve (50) which is slidingly and sealingly received at an end (40D) of the solenoid valve (40). The shuttle valve (50) includes a stepped interior opening (54) which includes an insert (55) providing a shuttle valve seat (91) opposite a self-aligning solenoid valve seat assembly (94) of the solenoid valve (40). The valve seat (91) of the shuttle valve (50) includes an orifice (92) which extends from an end opening (70) of the insert and communicates with an insert passage (63) at an outer radial portion of the insert (55). An opposite radial side of the insert (55) includes a port (67) which communicates with a longitudinal passage (66) of the insert (55). Disposed within the longitudinal passage (66) is a brakemaster cylinder check valve (59), and a stabilization check valve (58) adjacent a filter element (80) which permits communication with the insert passage (63). The shuttle valve (50) includes an end passage (64) having a pump check valve (57) and which communicates with an interior cavity (65) of the insert member (55). Fluid pressure from a pump mechanism (18) causes the shuttle valve (50) to be displaced and engage the shuttle valve seat (91) with the self-aligning valve seat assembly (94) so that fluid pressure from the pump mechanism (18) passes around the pump check valve (57), through the filter element (80) and insert passage (63), and out both ends of the orifice (92) for transmission to a second bore section (72) and a wheel brake (16) and to a first bore section (71) and a pressure producing device such as a master cylinder (12).

13 Claims, 2 Drawing Sheets

COMBINATION SOLENOID VALVE AND SHUTTLE VALVE WITH SELF-CLEANING ORIFICE

The present invention relates generally to a combination solenoid valve and shuttle valve with a self cleaning orifice, and in particular to an electrically operated valve mechanism for an adaptive braking system.

Numerous adaptive braking systems have been proposed previously. Adaptive braking systems can typically include numerous solenoid valves, check valves, flow restrictions, shuttle valves, and various types of pressure source mechanisms. In adaptive braking systems which utilize solenoid valves and shuttle valves, it is highly desirable to combine structurally a solenoid valve with its respective shuttle valve. Combined solenoid valve and shuttle valve structures are disclosed in U.S. Pat. Nos. 4,620,565; 4,844,119; and 4,936,344. The combined structure has a potential for greatly simplifying the number and complexity of plumbing connections, and substantially reducing the cost of the entire system. Copending patent application No. 07/792,550 and U.S. Pat. No. 5,163,474 both filed Nov. 15, 1991 disclose combination solenoid valve and shuttle valve structures. It is highly desirable to provide such a combined structure which will be effective to prevent the contamination of the internal parts of the structure. During the manufacturing and assembly process, numerous items of contamination can work their way into the structure or assembly and result in subsequent plugging of the fluid pressure build and feedback orifices. Therefore, it is highly desirable to relocate the build and feedback orifices so that during an operation of the combination solenoid valve and shuttle valve structure the orifices will receive a washing or flushing and contamination is washed away. Such a self-cleaning mechanism will make build and feedback orifice designs more robust and reliable.

The present invention provides solutions to the above problems by providing a combination solenoid valve and shuttle valve, comprising a body having therein a bore comprising a first bore section, a second bore section, and a third bore section sealingly isolated from one another at the perimeter of the bore, the first bore section able to receive pressure from a pressure producing device and pump means, the solenoid valve and shuttle valve disposed within the bore and the solenoid valve operable to communicate said second bore section with said third bore section, the shuttle valve having an interior opening receiving sealingly and slidingly an end of said solenoid valve, the shuttle valve slidable to cooperate with said end of the solenoid valve to direct fluid from the pump means primarily toward said second bore section, resilient means disposed within the interior opening of the shuttle valve between the shuttle valve and the end of the solenoid valve to bias the shuttle valve away from the solenoid valve, the end of the solenoid valve including a solenoid valve seat and the shuttle valve comprising a shuttle valve seat having therein an orifice, the shuttle valve having an interior cavity with a filter member located therein and permitting communication through the filter member to shuttle passage means which communicates with said shuttle valve seat, such that fluid pressure received from the pump means causes said shuttle valve to be displaced and engage the shuttle valve seat with the solenoid valve seat so that the fluid pressure is transmitted through the filter member, shuttle passage means, and the orifice to the first bore section and to the second bore section via the solenoid valve.

The invention is describe din detail below with reference to the drawings which illustrate an embodiment in which.

Figure 1:
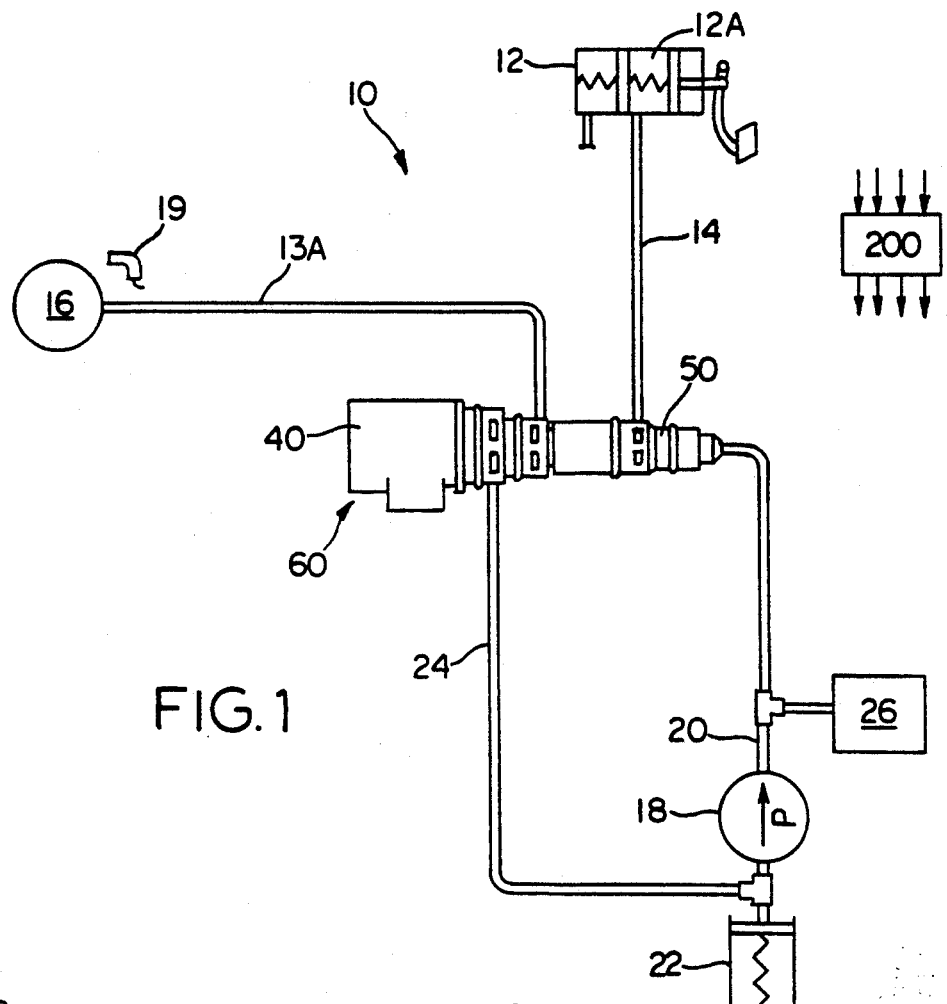
FIG. 1 is a schematic of an adaptive braking system illustrating the plumbing connections effected by the combination solenoid valve and shuttle valve of the present invention.

Referring to FIG. 1, there is illustrated the actual hardware and plumbing connections which are utilized in conjunction with the combination solenoid valve and shuttle valve 60 of the present invention. FIG. 1 is identical to FIG. 2 of copending U.S. Pat. Application No. 07/792,550 and incorporated by reference herein. Master cylinder or pressure producing device 12 is connected by line 14 with shuttle valve 50 which slidably and sealingly engages an end of solenoid valve 40. Solenoid valve 40 communicates via line 13A with wheel brake 16, while line 24 communicates solenoid valve 40 with sump 22 and the inlet of pump 18. Pump 18, when anti-lock or adaptive braking system 10 is energized, provides fluid pressure through line 20 to shuttle valve 50, with noise chamber 26 communicating with line 20. The preferred embodiment of the combination solenoid valve and shuttle valve with self-cleaning orifice in accordance with the present invention will now be explained in detail with reference to FIGS. 2 and 3.

Figure 3:
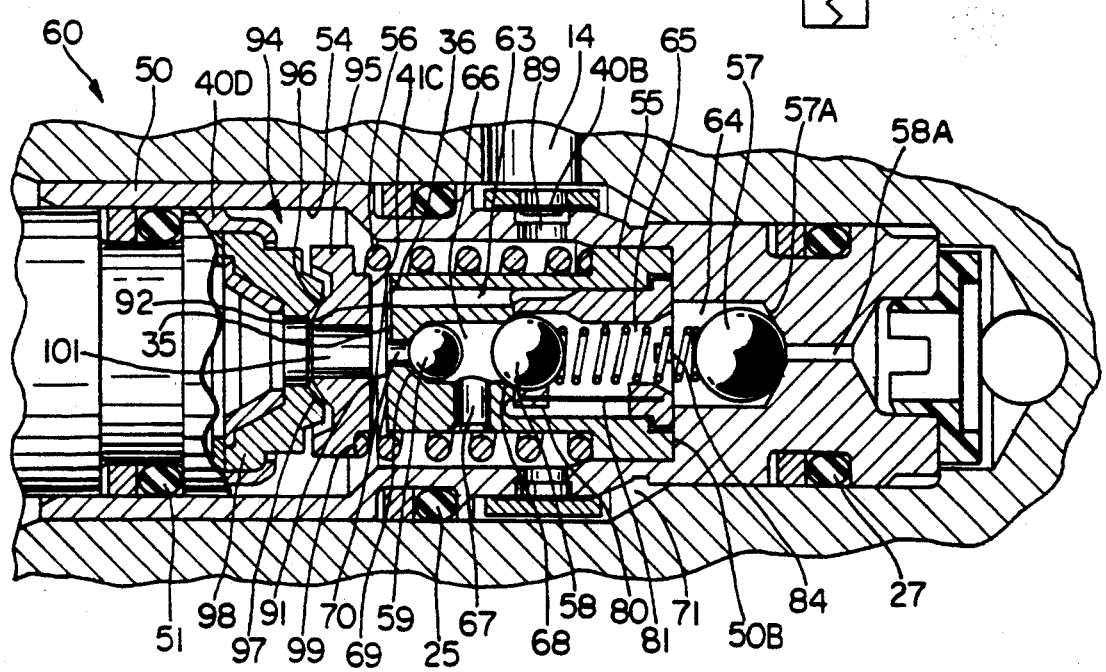
FIG. 3 is an enlarged section view of the shuttle valve disposed at the end of the solenoid valve in FIG. 2.
Figure 2:
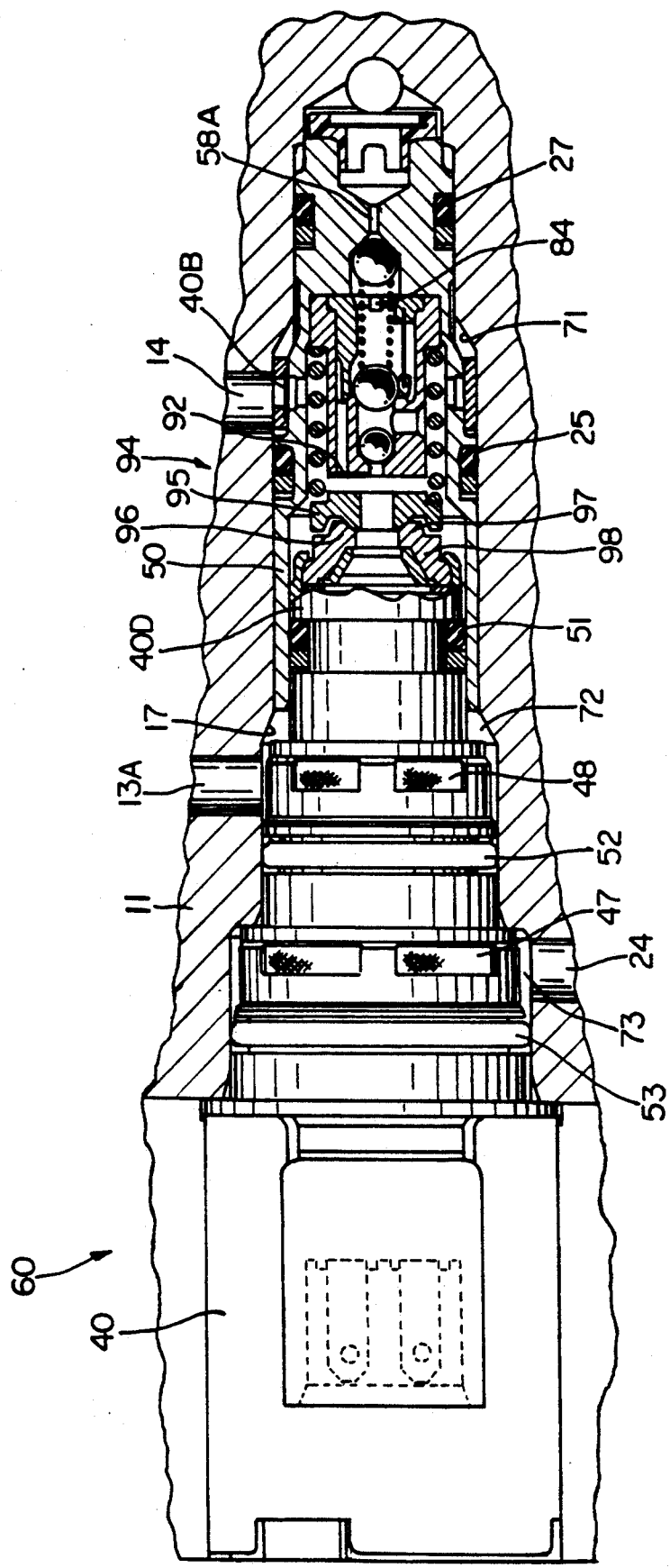
FIG. 2 is a section view of the combination solenoid valve and shuttle valve of FIG. 1.

Referring to FIG. 2, the combination solenoid valve and shuttle valve of the present invention is referenced generally by reference numeral 60. Solenoid valve and shuttle valve 60 includes build/decay solenoid valve 40 and shuttle valve 50. Body 11, such as a modulator body, includes therein stepped bore 17 which comprises first bore section 71, second bore section 72 and third bore section 73. Third bore section 73 communicates with sump 22 via line 24, second bore section 72 communicates with wheel brake 16 via line 13A, and first bore section 71 communicates with master cylinder 12 via line 14. Located about solenoid valve 40 are filters 47 and 48 while shuttle valve 50 includes filter 40B. Three seals 51, 52, and 53 are located about the exterior of solenoid valve 40. Solenoid valve 40 and stepped bore 17 define with seals 51 and 52 a portion of second bore section 72 while seals 52 and 53 define with stepped bore 17 and solenoid valve 40 third bore section 73. Located about shuttle valve 50 is seal 25 which provides a sealing interface between second bore section 72 and first bore section 71, the other end of first bore section 71 being defined by seal 27 about shuttle valve 50. Referring to FIG. 3, shuttle valve 50 includes a stepped exterior profile and a stepped interior opening 54 whose surface slidably and sealingly engages solenoid valve seal 51 at end 40D. Stepped interior opening 54 includes shuttle insert 55 which is biased by spring 56 so that shuttle valve 50 is biased away from solenoid valve 40. Stepped interior opening 54 provides a shoulder 50B as a seat for insert 55, and end passage 64 includes orifice 58A for creating a pressure differential in the pump fluid flow and pump check valve seat 57A engaged by pump check valve 57. Insert 55 includes interior cavity 65 which communicates with longitudinal passage 66. Passage 66 communicates with radial or lateral port 67 that communicates with first bore section 71. Shuttle valve insert 55 includes stabilization valve 58 and floating brake-master cylinder check valve 59. Stabilization check valve 58 engages valve seat 68 and floating brake-master cylinder check valve 59 may engage valve seat 69. Port 67 communicates with longitudinal passage 66 at an area between check valves 58 and 59. Brake-master cylinder check valve 59 controls fluid flow through an end opening 70 of insert 55. Insert 55 includes shuttle or insert passage means 63 which communicates at one end with the interior cavity 65 of insert 55 and at the other end with shuttle valve seat 91. Shuttle valve seat 91 includes radial orifice 92 extending between end opening 70 and a side of shuttle valve 55 such that orifice 92 intersects and communicates with insert passage means 63. In FIG. 3, feedback orifice 36 comprises the radially outer portion of orifice 92 while build orifice 35 comprises the radially inner portion of orifice 92.

Shuttle valve insert 55 includes filter element 80 having an annular end which engages the periphery of check valve seat 68. Filter 81 of filter element 80 permits fluid flow from the interior cavity 65 of insert 55 to insert passage means 63. Filter element 80 includes slots 84 that permit fluid flow past check valve 57 if valve 57 engages element 80.

Solenoid valve seat assembly 94 (see FIGS. 2 and 3) comprises a two-piece, self aligning valve seat made up of first piece 95 having a spherical shaped end portion 96 engaging a frustoconical shaped portion 97 of second piece 98. First piece 95 includes shoulder 99 which provides a seat for resilient means or spring 56. The center of rotation of spherical end portion 96 is located on valve seat 41C so that there will be no relative sliding between valve seats 41C and 91 as piece 95 adjusts. Thus, first piece 95 may move relative to second piece 98 so that first piece 95 and valve seat 41C align perfectly with valve seat 91 of the shuttle valve.

During normal braking, fluid pressure is generated in master cylinder 12 and transmitted via line 14 to shuttle valve 50 where it communicates with stepped interior opening 54 via shuttle lateral openings 89. The fluid passes around shuttle valve seat 91 and into solenoid valve passage 101 for communication via solenoid valve 40 with second bore section 72, line 13A and wheel brake 16. When an imminent wheel skid is sensed by wheel speed sensors 19 and electronic control unit (ECU) 200 of adaptive braking system 10, ECU 200 activates solenoid valve 40 which through a not shown interior valve permits fluid pressure at brake 16 to decay or flow through the solenoid valve to third bore section 73, line 24 and sump 22. At the same time, pump 18 is activated by ECU 200 and provides increased fluid pressure via line 20 connected to the end of shuttle valve 50. Orifice 58A of end passage 64 creates a pressure differential across the orifice which facilitates displacement of the shuttle valve 50. Fluid pressure is decayed away from wheel brake 16 at the same time that fluid pressure is being provided by pump 18 to shuttle valve 50, and the shuttle valve is displaced toward the left in FIG. 3 so that valve seat 91 of shuttle valve insert 55 engages valve seat 41C of second piece 95 of self-aligning valve seat assembly 94. This engagement effectively isolates master cylinder 12 from most of the pressure generated by pump 18. Thus, the normal brake fluid path from the master cylinder to the wheel brake is effectively shut off by the translation of shuttle valve 50 to the left against spring 56 whereby valve seat 91 engages cooperatively valve seat 41C. Shuttle valve 50 will stay in this translated or stroked position during the entire anti-lock braking system cycle. During this time, fluid pressure from pump 18 causes pump check valve 57 to open and permit fluid flow to the interior cavity 65 of insert 55, through filter 81 of filter element 80, to insert passage means 63 and out both ends of orifice 92 so that the fluid pressure is transmitted through build orifice 35 to solenoid valve 40 via opening 101 for transmission to line 13A and brake 16 while fluid pressure is also transmitted through feedback orifice 36 to stepped interior 54 for transmission through lateral openings 89 and line 14 to master cylinder 12. As ECU 200 controls solenoid valve 40, the solenoid valve will modulate the not shown interior valve to simultaneously reduce the amount of pump generated brake fluid pressure being transmitted to wheel brake 16 via line 13A and effect the decay of brake fluid pressure from the brake toward sump 22 via filter 47 and line 24.

Stabilization check valve 58 provides for the stabilization of fluid pressure provided to wheel brake 16 in the event that master cylinder generated pressure should ever exceed the pressure received from pump 18. When shuttle valve 50 is in the shuttled position and seat 91 engages seat 41C, master cylinder pressure may exceed the pump pressure when the ECU 200 deactivates pump 18 at the end of an anti-lock braking cycle. The pressure from the master cylinder is transmitted via line 14, lateral openings 89, and port 67 to disengage stabilization check valve 58 from seat 68 so that the fluid pressure may flow through filter 81 to insert passage means 63, build orifice 35, solenoid valve passage 101 and to the wheel brake via solenoid valve 40 and line 13A. During the deactivation phase of an anti-lock braking cycle, and before shuttle valve 50 may reshuttle toward the right and return to the at-rest position illustrated in FIG. 3, the brake-master cylinder check valve 59 may be unseated from valve seat 69 so that higher fluid pressure at the wheel brake may be transmitted to passage 66, port 67, and back toward master cylinder 12. Most importantly, at the cessation of an anti-lock braking cycle, shuttle valve 50 will return toward the right in FIG. 3 so that orifice 92 at shuttle valve seat 91 completely disengages solenoid valve seat 41C whereby fluid flows freely through and past the orifice and effects a thorough washing thereof. During the post anti-lock braking cycle, the fluid flow is in the reverse direction i.e. toward master cylinder 12. This provides a very efficient self-cleaning mechanism that renders the utilization of orifice 92, as both build and feedback orifices 35 and 36, a very robust and reliable design. This positive orifice flushing feature of the present invention can effectively prevent contamination of orifice and other internal parts of the combination solenoid valve and shuttle valve 60.

We claim:

1. A combination solenoid valve and shuttle valve, comprising a body having therein a bore comprising a first bore section, a second bore section, and a third bore section sealingly isolated from one another at the perimeter of the bore, the first bore section able to receive pressure from a pressure producing device and pump means, the solenoid valve and shuttle valve disposed within the bore and the solenoid valve operable to communicate said second bore section with said third bore section, the shuttle valve having an interior opening receiving sealingly and slidingly an end of said solenoid valve, the shuttle valve slidable to cooperate with said end of the solenoid valve to direct fluid from the pump means primarily toward said second bore section, resilient means disposed within the interior opening of the shuttle valve between the shuttle valve and the end of the solenoid valve to bias the shuttle valve away from the solenoid valve, the end of the solenoid valve including a solenoid valve seat and the shuttle valve comprising a shuttle valve seat having therein an orifice, the shuttle valve having an interior cavity with a filter member located therein and permitting communication through the filter member to shuttle passage means which communicates with said shuttle valve seat, such that fluid pressure received from the pump means causes said shuttle valve to be displaced and engage the shuttle valve seat with the solenoid valve seat so that the fluid pressure is transmitted through the filter member, shuttle passage means, and the orifice to the first bore section and to the second bore section via the solenoid valve.

2. The combination solenoid valve and shuttle valve in accordance with claim 1, wherein the interior opening of said shuttle valve includes an end passage aligned with the interior cavity and including a pump check valve engagable with a pump check valve seat at the shuttle valve so that fluid pressure received from the pressure producing device cannot be transmitted toward said pump means.

3. The combination solenoid valve and shuttle valve in accordance with claim 2, wherein the end passage includes an orifice which creates thereacross a pressure differential in the fluid pressure from the pump means.

4. The combination solenoid valve and shuttle valve in accordance with claim 1, wherein the shuttle valve includes an insert within the interior opening and which includes the interior cavity.

5. The combination solenoid valve and shuttle valve in accordance with claim 4, wherein the insert includes a lateral port communicating with a longitudinal passage having at the shuttle valve seat an opening through which fluid flow is controlled by a floating check valve engaging an associated check valve seat and adjacent said filter member a stabilization check valve engagable with a stabilization valve seat of the insert.

6. The combination solenoid valve and shuttle valve in accordance with claim 5, wherein the stabilization check valve can be displaced from the stabilization valve seat by pressure from the pressure producing device when the pump means ceases operation so that fluid pressure can be transmitted through the filter element, shuttle passage means, and orifice to the second bore section to provide a stabilized pressure at the termination of operation of the pump means.

7. The combination solenoid valve and shuttle valve in accordance with claim 1, wherein the solenoid valve seat comprises a two-piece self-aligning valve seat assembly wherein a first piece includes a spherical portion which engages a frustoconical portion of a second piece, the first piece providing a seat for said resilient means such that the first piece is movable to effect self-alignment between the solenoid valve seat and shuttle valve seat.

8. The combination solenoid valve and shuttle valve in accordance with claim 7, wherein the shuttle passage means extends from the interior cavity and adjacent the filter member to an opening at the orifice, so that fluid pressure from said pump means and pressure producing device may be transmitted to the orifice for transmission to the second bore section.

9. A combination solenoid valve and shuttle valve, comprising a body having therein a bore comprising a first bore section, a second bore section, and a third bore section sealingly isolated from one another at the perimeter of the bore, the first bore section able to receive pressure from a pressure producing device and pump means, the solenoid valve and shuttle valve disposed within the bore and the solenoid valve operable to communicate said second bore section with said third bore section, the shuttle valve having an interior opening receiving sealingly and slidingly an end of said solenoid valve, the shuttle valve slidable to cooperate with said end of the solenoid valve to direct fluid from the pump means primarily toward said second bore section, resilient means disposed within the bore and biasing the shuttle valve away from the solenoid valve, the end of the solenoid valve including a solenoid valve seat and the shuttle valve comprising a shuttle valve seat having therein an orifice, the shuttle valve having an interior cavity communicating with shuttle passage means which communicates with said shuttle valve seat, such that fluid pressure received from the pump means causes said shuttle valve to be displaced and engage the shuttle valve seat with the solenoid valve seat so that the fluid pressure is transmitted through the passage means and the orifice to the first bore section and to the second bore section via the solenoid valve, the shuttle valve including a port communicating with a longitudinal passage having at the shuttle valve seat an opening through which fluid flow is controlled by a floating check valve engageable with an associated check valve seat and disposed opposite therefrom a stabilization check valve engagable with a stabilization valve seat of the shuttle valve the stabilization valve displacable from the stabilization valve seat by pressure from the pressure producing device when the pump means ceases operation so that fluid pressure can be transmitted through the shuttle passage means and orifice to the second bore section to provide a stabilized pressure at the termination of operation of the pump means.

10. The combination solenoid valve and shuttle valve in accordance with claim 9, wherein the interior opening of said shuttle valve includes an end passage aligned with the interior cavity and including a pump check valve engagable with a pump check valve seat at the shuttle valve so that fluid pressure received from the pressure producing device cannot be transmitted toward said pump means.

11. The combination solenoid valve and shuttle valve in accordance with claim 9, wherein the end passage includes an orifice which creates thereacross a pressure differential in the fluid pressure from the pump means.

12. The combination solenoid valve and shuttle valve in accordance with claim 9, wherein the solenoid valve seat comprises a two-piece self-aligning valve seat assembly wherein a first piece includes a spherical portion which engages a frustoconical portion of a second piece, the first piece providing a seat for said resilient means such that the first piece is movable to effect self-alignment between the solenoid valve seat and shuttle valve seat.

13. The combination solenoid valve and shuttle valve in accordance with claim 12, wherein the shuttle passage means extends from the interior cavity to an opening at the orifice, so that fluid pressure from said pump means and pressure producing device may be transmitted to the orifice for transmission to the second bore section.

* * * * *